US012687146B2

(12) United States Patent
Cotrell et al.

(10) Patent No.: US 12,687,146 B2
(45) Date of Patent: Jul. 21, 2026

(54) CONVERTING WAVE MOTION INTO ELECTRICAL ENERGY

(71) Applicant: RCAM Technologies, Inc., Boulder, CO (US)

(72) Inventors: Jason Rust Cotrell, Boulder, CO (US); Eduardo Rangel, Boulder, CO (US); Mason James Bell, Long Beach, CA (US)

(73) Assignee: RCAM Technologies, Inc., Boulder, CO (US)

( * ) Notice: Subject to any disclaimer, the term of this patent is extended or adjusted under 35 U.S.C. 154(b) by 0 days.

(21) Appl. No.: 19/076,641

(22) Filed: Mar. 11, 2025

(65) Prior Publication Data

US 2026/0117736 A1 Apr. 30, 2026

Related U.S. Application Data

(60) Provisional application No. 63/564,258, filed on Mar. 12, 2024.

(51) Int. Cl.
*F03B 13/18* (2006.01)
*B33Y 80/00* (2015.01)
*E02B 3/06* (2006.01)

(52) U.S. Cl.
CPC ............... *F03B 13/18* (2013.01); *E02B 3/06* (2013.01); *B33Y 80/00* (2014.12); *F05B 2220/706* (2013.01)

(58) Field of Classification Search
CPC . F03B 13/18; E02B 3/06; B33Y 80/00; F05B 2220/706
See application file for complete search history.

(56) References Cited

U.S. PATENT DOCUMENTS

2019/0353139 A1* 11/2019 Sheldon-Coulson .........................
H02K 7/1823

FOREIGN PATENT DOCUMENTS

WO WO-2012128491 A2 * 9/2012 .............. F03B 17/06

OTHER PUBLICATIONS

Baker, et al., "Design and Physical Model Studies of Innovative Living Breakwaters", Coastal Engineering Proceedings, vol. 36, Dec. 30, 2018, 12 pages.
Ikiz, Serrau. , "3D-printed artificial reefs to restore coral ecosystems", Parametric Architecture, https://parametric-architecture.com/3d-printed-artificial-reefs-to-restore-coral-ecosystems/ (accessed Oct. 8, 2023), Oct. 4, 2022, 10 pages.

(Continued)

*Primary Examiner* — Joseph Ortega

(74) *Attorney, Agent, or Firm* — Henry Patent Law Firm PLLC

(57) ABSTRACT

In a general aspect, a system is described for converting wave motion into electrical energy. The system may include a support structure formed of layers of cementitious material that define respective ridge surfaces on an exterior surface of the support structure. The system may also include a wave energy converter supported by the support structure and configured to generate electrical energy in response to flowing water contacting a movable surface of the wave energy converter.

6 Claims, 10 Drawing Sheets

SEE FIG. 2A-2

(56)          References Cited

OTHER PUBLICATIONS

Maki, et al., "Waveroller—One of the Leading Technologies for Wave Energy Conversion", 5th International Conference on Ocean Energy, Nov. 4-6, 2014, https://www.ocean-energy-systems.org/publications/icoe/icoe-2014/document/-waveroller-a-one-of-the-leading-technologies-for-wave-energy-conversion/, 7 pages.

Saengsupavanich, et al., "Environmental impact of submerged and emerged breakwaters", Heliyon, No. 8 e12626, Dec. 19, 2022, 9 pages.

Williams, Alan, "Living seawall creates a space for nature along the coastline of Plymouth Sound", University of Plymouth, Press Office, https://www.plymouth.ac.uk/news/living-seawall-creates-a-space-for-nature-along-the-coastline-of-plymouth-sound, Sep. 1, 2023, 4 pages.

Yoris-Nobile, et al., "Artificial reefs built by 3D printing: Systematisation in the design, material selection and fabrication", Construction and Building Materials, vol. 362 No. 129766, https://doi.org/10.1016/j.conbuildmat.2022.129766, Nov. 21, 2022, 17 pages.

* cited by examiner

Accumulators store
and level energy

CONVERTING WAVE MOTION INTO ELECTRICAL ENERGY

CROSS-REFERENCE TO RELATED APPLICATIONS

This application claims priority to U.S. Prov. App. No. 63/564,258, which was filed Mar. 12, 2024 and is entitled "Energy Converter Systems Having Living Breakwaters." The disclosure of this priority application is hereby incorporated by reference in its entirety.

BACKGROUND

The following description relates to converting wave motion into electrical energy.

Coastal regions are areas where land meets a body of water, such as the ocean. The coastal regions may have shores that are influenced by the topography of the surrounding landscape, as well as by water-induced erosion, such as waves. Coastal regions are important zones in natural ecosystems, often home to a wide range of biodiversity. Moreover, the waves present in coastal regions can serve as a renewable source of hydrokinetic power.

DESCRIPTION OF DRAWINGS

FIG. 2A-1 a schematic diagram, in perspective view, of an example system for converting wave motion into electrical energy;

FIG. 2A-2 a schematic diagram, in detail view, showing a portion of a support structure of the example system of FIG. 2A-1;

FIG. 6A-1 is a schematic diagram, in perspective view, of a second example system for converting wave motion into electrical energy;

FIG. 6A-2 is a schematic diagram, in detail view, showing a portion of a support structure of the second example system of FIG. 6A-1.

DETAILED DESCRIPTION

In a general aspect, an energy converter system may include a living breakwater and a wave energy converter. The energy converter system may be installed in coastal areas, and the living breakwater may be integrated into or configured as a natural, ecological structure (e.g., a reef).

Figure 1:
FIG. 1 is a schematic diagram, in perspective view, of an example of a living breakwater energy converter system that is deployed at a coastal location.

Certain example energy converter systems are referred to herein as a coastal structure integrated wave energy converter (CSI-WEC) or a reef wave energy converter (Reef-WEC). FIG. 1 presents a schematic diagram, in perspective view, of an example of a living breakwater energy converter system that is deployed at a coastal location. Other types of energy converter systems are also within the scope of the present disclosure, and the features of examples described (e.g., features CSI-WECs and Reef-WECs) may be modified, combined, or deployed in other embodiments.

Figures 1, 2A:
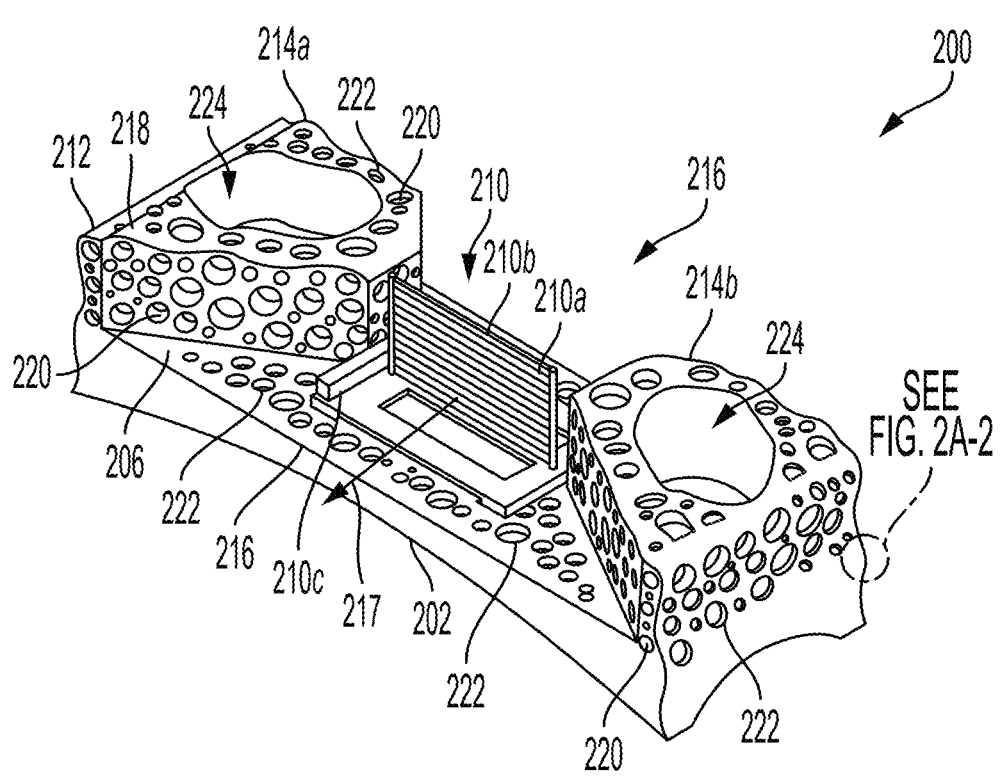

Coastal communities and military bases increasingly need affordable, nonpolluting, resilient energy. Also, as sea levels rise, coastal assets may be vulnerable to flooding and wave damage. In some implementations, the energy converter systems (e.g., CSI-WECs, Reef-WECs, etc.) described herein may include one or more wave energy converters and one or more 3D-printed living breakwaters. These converters can provide infrastructural resilience, environmental restoration, and affordable clean power. Moreover, the converters can generate clean, stable power for coastal communities, enhance coastal resilience, and restore coastal ecosystems. FIG. 2A-1 presents a schematic diagram, in perspective view, an example system 200 for converting wave motion into electrical energy. In certain cases, the example system 200 may correspond to a Reef-WEC. The Reef-WEC may include a surge-type WEC with a living breakwater (e.g., artificial reef) that is configured similar to a natural reef barrier (e.g., a Hawaiian reef barrier). In FIG. 2A-1, a nonspecific surge-type WEC is depicted. However, other types of WECs are possible. The large cavities in the reef can be filled after emplacement with low-cost, low-emissions ballast (e.g., recycled concrete, sand, stone).

In some variations, energy converter systems (e.g., CSI-WECs, Reef-WECs, etc.) are configured to generate 10 to 30 kW of electrical power. In these variations, energy converter systems may be designed to meet ecological, logistical, and structural requirements. Numerical simulations may be used model the energy converter systems such as CSI-WECs or Reef-WECs. In variations, the reef sections of the energy converter systems may be fabricated using additive manufacturing techniques, such as layer-by-layer deposition of cementitious materials (e.g., 3D printing of cementitious materials).

In some implementations, energy converter systems (e.g., CSI-WECs, Reef-WECs, etc.) improve coastal resilience in the face of rising sea levels. The average global sea level has risen 8-9 inches since 1880 and sea-level rise is predicted to accelerate, with another 1 foot predicted for U.S. coasts by 2050 and higher levels beyond. Rising seas are already damaging coastal communities, ecosystems, and civil infrastructure by amplifying inundation, infiltration, storm surge, and waves as well as by increasing storm frequency and intensity. Coastal resilience in the face of these threats is of concern to governmental and regulatory agencies.

In some implementations, energy converter systems (e.g., CSI-WECs, Reef-WECs, etc.) can combine coastal resilience with energy production (e.g., electrical energy). Energy supply is also a critical aspect of resilience. Coastal locations are more exposed to storm damage and can be linked less robustly to grids. Local, renewable energy generation that is affordable, resilient, nonpolluting, and does not emit greenhouse gases that amplify sea-level rise is often a priority for such communities. For example, the U.S. Department of Energy's Resilient Coastal Communities program, among other goals, promotes integration of wave energy systems with piers, jetties, and breakwaters to provide shoreline protection, generate power, improve power source diversity, and reduce reliance on diesel fuel.

Coastal resilience can also be increased through protection, accommodation, or managed retreat. However, established high-value infrastructure is typically ill-suited to accommodation or retreat. Coastal protection approaches can be classed as "hard" or "soft". For example, "hard" protection may correspond to the construction of obdurate barriers such as breakwaters, dikes, groins, levees, revetments, bulkheads, quay walls, and seawalls. "Soft" approaches can include dune rehabilitation, marsh restoration, and beach nourishment (e.g., adding sand). In certain cases, "hard" protection provides immediate gains but does not constitute a reliable, long-term response to coastal threats. For instance, seawalls can exacerbate erosion, affect the seabed and neighboring coasts, and diminish the coastline's ability to respond to changing conditions. Moreover, making seawalls high enough to resist wave overtopping, especially as seas rise rapidly, can be prohibitively expensive.

In some implementations, energy converter systems (e.g., CSI-WECs, Reef-WECs, etc.) combine aspects of protection and accommodation in a hybrid infrastructure and ecosystem-based adaptation approach. In these implementations, a living breakwater may combine artificial reefs with natural coastal ecosystem growth of oyster beds and coral reefs to mitigate flooding and erosion.

Figure 3A:
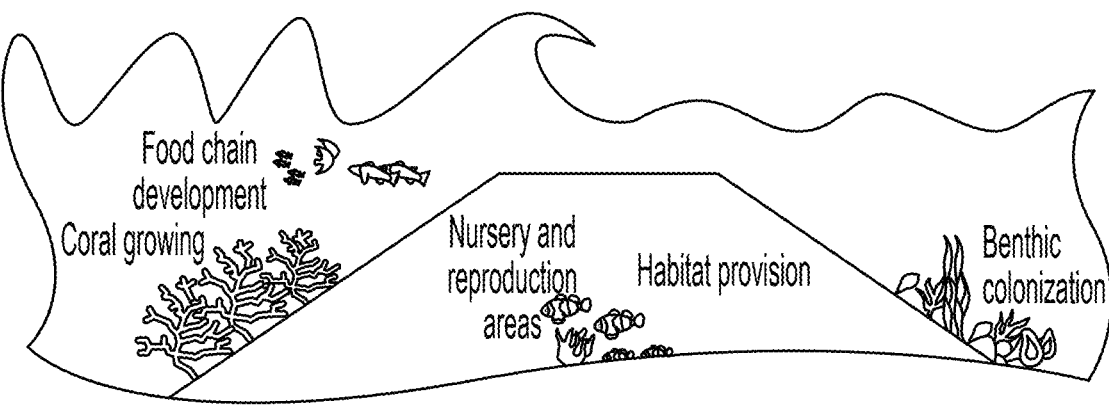
FIG. 3A is a schematic diagram, in elevation view, of an example of ecological functions of a submerged breakwater.
Figure 3B:
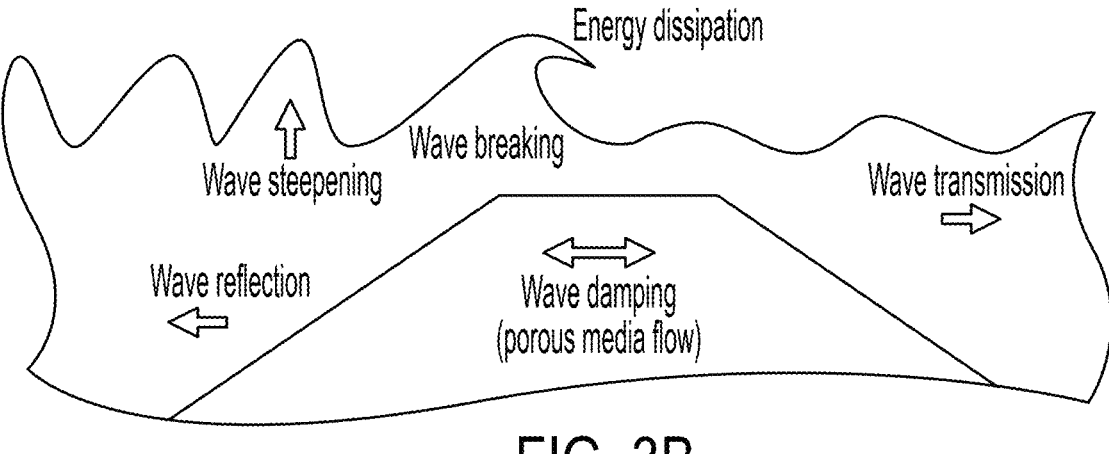
FIG. 3B is a schematic diagram, in elevation view, of an example of hydrodynamic functions of the submerged breakwater of FIG. 3A.

Reefs are highly effective in promoting coastal resilience, being able to reduce wave height and incident wave energy by large percentages, e.g., up to 84% and 97% respectively. FIG. 3A presents a schematic diagram, in elevation view, of an example of ecological functions of a submerged breakwater. FIG. 3B presents a schematic diagram, in elevation view, of an example of hydrodynamic functions of the submerged breakwater of FIG. 3A.

Mechanisms for wave attenuation by reefs include wave breaking, reflection, overtopping, and frictional dissipation, with wave breaking the most important. Annual benefits presently realized from flood risk reduction by coral reefs in the U.S. are estimated at 18,000 saved lives and $1.8 billion (2010 U.S. dollars) in prevented damage and uninterrupted business activity. However, natural reefs do not exist in many locations and, where present, are rapidly declining, with many in a critical state. Moreover, traditional breakwaters—typically impermeable structures of stone or concrete—can compromise the ability of beaches to adapt to changing conditions, interrupt nearshore hydro-dynamic regimes and sediment transport, affect surrounding assemblage structures, have few restorative benefits, and can be costly.

Artificial reefs, bioengineered coral and oyster reefs systems, also known as living breakwaters, can be fabricated and installed quickly, providing immediate projection that increases as organisms colonize the structures. In some implementations the, living breakwaters incorporate natural habitat components while protecting the coastline. They can also be semi-permeable concrete structures, such as reefs or solid submerged or non-submerged designs that attenuate large, potentially damaging waves and currents while allowing small waves and currents to pass. Semi-permeable and submerged designs may reduce the higher water temperatures and harmful sediment buildup common on the leeward side of traditional breakwaters, avoiding negative impacts and cutting both mass and cost of the structure. Submerged designs also have little or no negative visual impact from shore. Further, living breakwaters create habitat by incorporating complex structural features that provide shelter and habitat for various marine and aquatic species (e.g., see FIG. 2A-1). Hosted organisms such as oysters and corals contribute to wave attenuation.

In some implementations, a bio-inspired living-breakwater energy converter system may combine a WEC with 3D concrete-printed (3DCP) artificial reefs. These energy converter systems may include living breakwaters that are configured to physically simulate natural reefs (e.g., Hawaiian reefs, Australia's Great Barrier Reef, etc.). These living breakwaters can replace ecologically damaging, traditional breakwater designs with a living-breakwater that also generates low-cost clean electricity. The energy converter systems can include a 3DCP gravity-base foundation and a WEC such as a surge device, a point absorber, or an oscillating wave column. In many variations, the energy converter systems are installed in or near coastlines. In some variations, the WEC is a completely submerged surge-type ("flap") device for initial development. As such, the WEC may sidestep objections to visible offshore devices by the public and are reported to produce electricity at the lowest cost. The WEC may also allow the energy converter systems to be invisible from shore, so they can be installed anywhere with the lease aesthetic concerns.

In some implementations, the versatile Reef-WEC platform can be digitally designed and manufactured for different reef geometries, water depths, and WEC sizes for varying site-specific requirements. For example, Reef-WEC geometries can be tailored to foster oyster growth needed to replenish and protect coastlines in energetic wave environments such as the U.S. West Coast, Gulf Coast, and Alaska. The artificial reef and its resident organisms, which increase bulk and roughen texture, attenuate and dissipate waves as they move through and around the structure, while the WECs both contribute to wave attenuation and provide low-cost, clean energy. The Reef-WEC can therefore, in many cases, reduce the environmental impacts of traditional breakwaters while providing additional environmental and economic benefits. Indeed, Reef-WEC installations can improve over time as they accumulate biomass. Instead of waging a never-ending struggle against biofouling of floating systems, the Reef-WEC hosts life by design, which can provide an ecological advantage.

Figures 2, 2A:
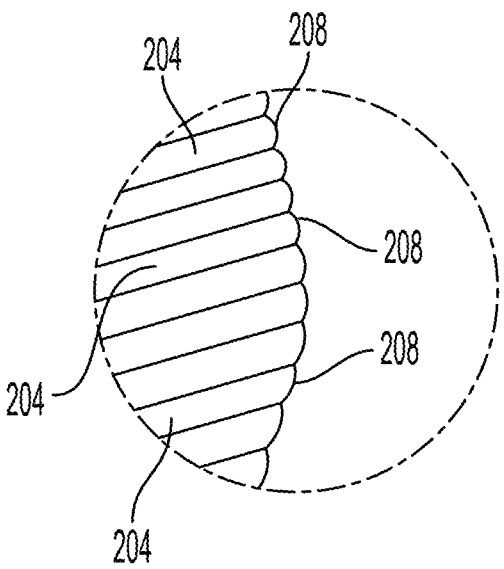

FIG. 2A-1 presents a schematic diagram, in perspective view, of an example system 200 for converting wave motion into electrical energy. The example system 200 includes a support structure 202 that is formed of layers of cementitious material 204. The cementitious material may include cement and aggregate (e.g., sand or gravel). In some instances, the cementitious material may also include reinforcing elements, such as fibers (e.g., steel fibers, polymer fibers, basalt fibers, glass fibers, etc.), rebar (e.g., steel rebar, basalt rebar, etc.), mesh (e.g., steel mesh, fiber mesh, etc.), cables, tendons, staples, and so forth. The layers of cementitious material 204 may, in certain cases, be deposited successively on top of each other by an additive manufacturing process, such as a 3D printing process. FIG. 2A-2 presents a detail view of the support structure 202, showing a portion that includes individual layers of cementitious material 204. The support structure 202 has an exterior surface 206 that is configured to support marine life on the support structure 202. For example, the exterior surface 206 may include surfaces that define ridges, grooves, pockets, nooks, and so forth on or in the support structure 202.

Figure 2B:
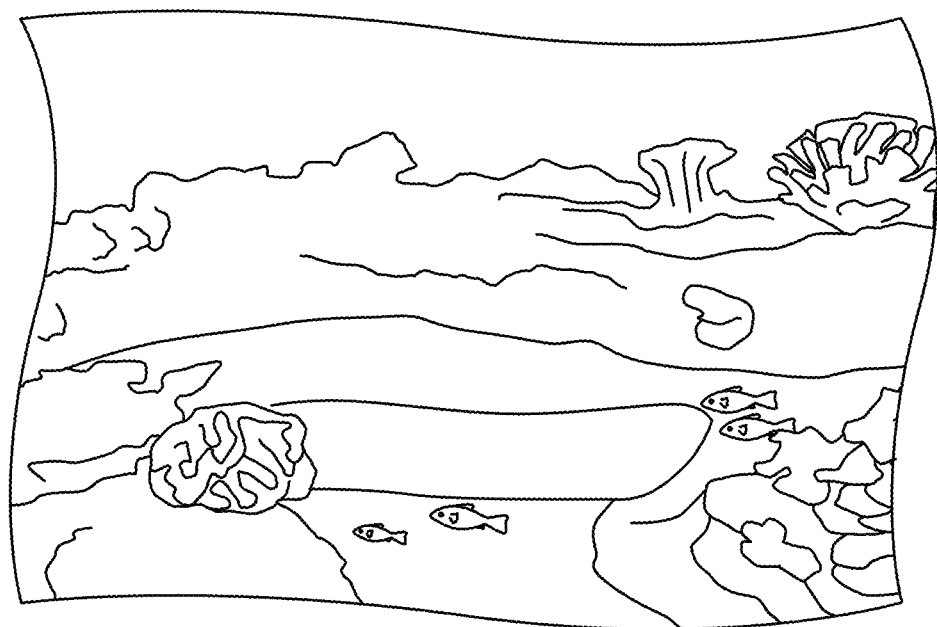
FIG. 2B is a schematic diagram, in elevation view, of an example of a natural reef barrier.

In many implementations, such as shown in FIG. 2A-2, the layers of cementitious material 204 define respective ridge surfaces 208 on the exterior surface 206 of the support structure. In the example shown, the ridge surfaces 208 are defined by raised strips or bands of cementitious material that form long, narrow, parallel ridges on the exterior surface 206. The structure of the ridge surfaces 208 may allow marine organisms (e.g., coral, sponges, anemone, etc.) to attach to and grow on the support structure 202, thereby providing a habitat for other types of marine animals (e.g., fish, octopuses, shrimp, urchins, clams, oysters, sea stars, etc.). When populated with marine life, the support structure 202 may function like a natural reef barrier, such as shown in FIG. 2B.

The example system 200 also includes a wave energy converter 210 that is supported by the support structure 202. The wave energy converter 210 is configured to generate electrical energy in response to flowing water (e.g., waves, currents, or other forms of flowing water) contacting a movable surface 210a of the wave energy converter 210. For instance, the wave energy converter 210 may include a flap 210b that is configured to move in response to the flowing water and includes the movable surface 210a. The wave energy converter 210 may also include an electrical generator 210c that is coupled to the flap 210b and configured to generate electrical energy in response to motion of the flap 210b. The electrical generator 210c may, in certain cases, be contained within a housing along with other components of the wave energy converter 210 (e.g., hydraulics, a gearbox, etc.). Examples of the wave energy converter 210 are described further in relation to FIGS. 5A and 5B.

In some implementations, the support structure 202 includes a breakwater 212 having first and second walls 214a, 214b that extend from a base 216 of the breakwater 212. The first and second walls 214a, 214b are separated from each other by a gap 216 through the breakwater 212. In certain cases, the gap 216 may reside above the base 216, such as shown in FIG. 2A-1. However, other locations are possible (e.g., through one of the walls). In these implementations, the wave energy converter 210 is disposed in the gap 216 and extends between the first and second walls 214a, 214b. Moreover, the first and second walls 214a, 214b are aligned along a direction that is perpendicular to a direction of water flow 217 through the gap 216. However, other orientations are possible for the walls 214a, 214b.

In many implementations, the exterior surface 206 of the support structure 202 includes an exterior surface 218 of the breakwater 212. In these implementations, the exterior surface 218 of the breakwater 212 includes one or more pocket surfaces 220 that define a pocket 222 extending into the breakwater 212 from the exterior surface 218. The pocket 222 may function to provide shelter for marine animals when the example system 200 is deployed in a marine environment. The pocket 222 may also allow marine organisms (e.g., coral, sponges, anemone, etc.) to attach to and grow on the support structure 202.

In some implementations, the first and second walls 214a, 214b of the breakwater 212 include respective ballast cavities 224 that are configured to receive ballast material. During deployment, the ballast cavities 224 may be filled with the ballast material (e.g., aggregate, rocks, etc.) to secure the example system 200 to a floor of a body of water. As such, the ballast material may be used to resist motion of the example system 200 away from a target position on the floor of the body of water. For example, the example system 200 may be deployed at a coastal location, such as shown in FIG. 1. In these deployments, the ballast material may be used to keep the example system 200 at a target distance from a beach as well as at a target orientation relative to incoming waves (e.g., perpendicular thereto).

In some implementations, such as shown in FIG. 2A-1, a Reef-WEC module concept incorporates (1) bio-friendly voids and textures, (2) cavities that are filled after emplacement with low-cost, low-emissions ballast (e.g., recycled concrete, local stone, sand), (3) a foundational arch for structural efficiency and integrity, (4) a bay or dock to house a submerged, surge-type WEC, and (5) an optional, funnel-shaped concentrator cross-section that increases energy delivered to the WEC. Since the WEC has a shorter lifetime (e.g., about 30 years) than the support structure (e.g., about 80 years), the WEC is designed for easy removal of the WEC for service or replacement. In contrast, the artificial reef may be designed to be left in place for its full-lifetime or, if desired, indefinitely. Reef-WECs can be fabricated to rest on the seabed on three or more feet or on a flat slab. The Reef-WEC model concept may also include a seabed interface that is configured to assure stability and prevent scour.

In some implementations, and as a submerged living breakwater, the Reef-WEC may combine one or more features, including: (1) a robust, low-cost, ballasted gravity base support structure having a durable, 3DCP, structurally optimized geometry, (2) subsea geometries, materials, and surfaces that nurture and restore marine habitats, (3) a submerged, modular WEC system mounted to the gravity base using quick-disconnects, and (4) a scalable 3DCP method of port-side manufacturing, float-out, and installation.

The energy converter systems may be configured to include flexible, domestic 3DCP manufacture. For example, a Reef-WEC platform can be fabricated using low-cost, scalable 3DCP materials and methods in nearby ports before being floated out to the installation site. 3DCP may also allow quick, low-cost, and flexible manufacturing without formwork using marine-friendly concrete materials to build surfaces and geometries that nurture native marine life. The flexibility of 3DCP can allow various WEC technologies to be adapted to the basic Reef-WEC substructure. In fact, submerged WECs may be used to eliminate aesthetic concerns of coastal communities.

Figure 4:
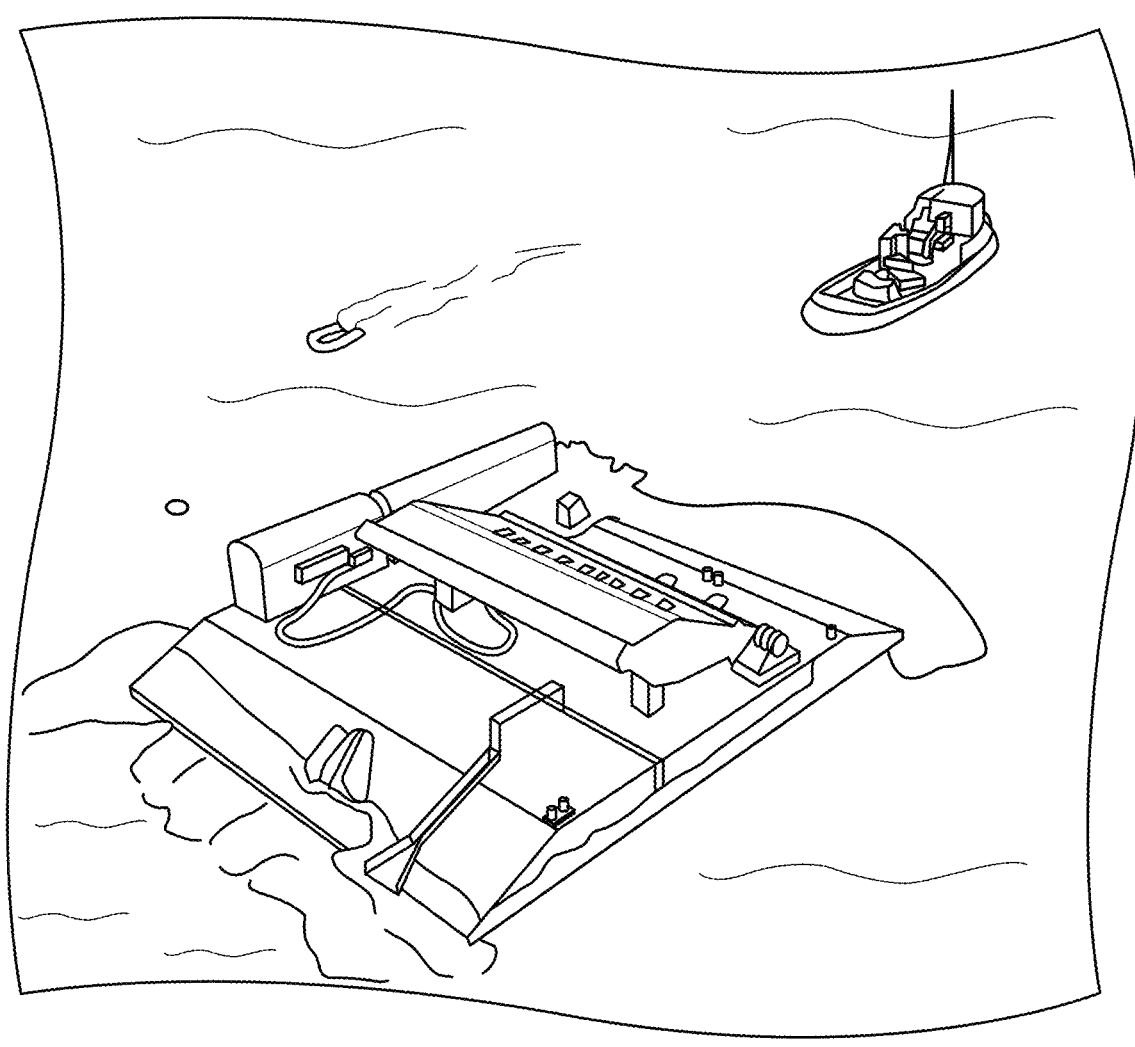
FIG. 4 is a schematic diagram, in perspective view, of an example wet-towing process of a utility scale WEC to an target site.

In some implementations, the Reef-WEC includes 3D printed concrete with a structurally optimized geometry. For example, this energy converter system may include a 3D printed monolithic, gravity-based Reef-WEC structure (e.g., the foundation and integrated artificial reef) that uses low-cost, durable concrete materials and non-metallic reinforcements to achieve a 50-to-80-year, near-zero-maintenance life for the structure. Moreover, each concrete structure can be manufactured in about 24 h at a port-side location and wet-towed to its deployment site. The WEC will be mounted on the support structure and operationally tested in the port before transport to the installation site. FIG. 4 a schematic diagram, in perspective view, of an example wet-towing process of a utility scale WEC to an target site. Here, the utility scale WEC is a "Wave Roller" type of WEC. However, other types of WECs are possible.

Under certain situations, the Reef-WEC structure is fabricated using conventional concrete manufacturing methods such as casting in forms or pre-casting. However, 3DCP is preferred because it: [1] eliminates costly and labor-intensive steel formwork required by traditional high-volume casting methods, [2] allows cost-effective, high-throughput, localized manufacturing inside a small footprint in space-constrained US ports, [3] is well suited to fabricating exceptionally large structures, [4] can be performed on a dock or a floating drydock, [5] increases production rates up to 95%, [6] enables versatile manufacturing of other marine energy technologies using the same equipment, materials, and workforce (e.g., anchors) for offshore wind and wave energy.

In some implementations, 3DCP technologies use digital fabrication processes to eliminate large, complex, heavy, multi-part, steel molds that are difficult and expensive to fabricate, modify, assemble, maintain, and store. 3DCP allows flexible manufacturing of large concrete structures without labor-intensive formwork in land-constrained ports with a relatively small footprint and workforce. A relocatable 3DCP manufacturing facility can be set up relatively quickly in industrial ports that already exist in many coastal cities. The Reef-WECs can thus be produced locally near target deployment sites using domestic supply chains and regionally available concrete materials. In addition, the versatile 3DCP equipment can also be used to fabricate non-powered artificial reefs and a variety of RCAM's other concrete offshore energy products including anchors, foundations, and towers for offshore solar and wind technologies, and subsea energy storage creating family-sustaining manufacturing careers and economic benefits for local communities.

3DCP can encompass several additive manufacturing technologies, including binder jetting, shotcrete, and extrusion. Large-scale 3DCP is scalable, technically feasible, and commercially viable for large offshore structures including, for example, post-tensioned bridges, wind turbine towers, anchors, and offshore wind foundations. A variety of 3DCP reinforcement strategies using both steel and non-metallic reinforcements can be deployed to quickly build large components such as curved walls and beams needed for renewable energy applications, and 3DCP concrete water tanks have been proven to be technically feasible.

The energy converter systems can be manufactured using 3D printers adapted for large multi-meter structures. For example, the 3D printer may be a commercial 3D printer capable of 23-m print height and up to 14-m width and length, which can allow the monolithic fabrication of a Reef-WEC with capacities up to approximately 100-kW capacity. Modular construction can be used to build larger Reef-WECs. However, in some variations, 3DCP printers are custom-built to fabricate monolithic structures with widths and heights up to approximately 50 meters and virtually unlimited lengths using a traveling printer configuration, thereby allowing monolithic fabrication of Reef-WECs with multi-MW power capacity.

The energy converter systems can include portions (e.g., a living breakwater) that are formed in whole or in part of cementitious material. The cementitious material may include steel reinforcements and natural or synthetic steel alternatives such as basalt (igneous rock) and glass fiber that do not corrode, are lighter, have excellent mechanical properties, and a smaller carbon footprint than steel. Such reinforcements can come, for example, in fibers, bars, continuous roving, and textile meshes.

In some implementations, the energy converter systems may include geometries, materials, and surfaces that nurture and restore marine habitats. Breakwaters are a common approach to shoreline defense. They provide substantial protection against severe storm conditions, reducing risks to coastal communities and local economic activities. Traditional breakwaters may be made from stone, concrete, or other building materials. Although the effectiveness of breakwaters is well-realized, they can produce negative impacts in certain cases. For example, hard coastal structures can compromise the ability of beaches to adapt to changing conditions, leading to passive and aggressive ecological consequences. Hard coastal structures can also significantly interrupt nearshore hydrodynamic regimes and sediment transport, affect surrounding assemblage structures, and can be more costly to build and maintain.

In contrast to hard coastal structures, a living breakwater can be designed to incorporate natural habitat components while still providing protection to the coastline. For example, artificial reef structures and seawalls can be configured to incorporate geometries (e.g., nooks, caves, and surface textures and chemistries) that will attract and nurture desired marine species. In some variations, the Reef-WEC is configured as a submerged living-breakwater that reduces the harmful environmental impacts of traditional breakwaters while providing additional environmental and economic benefits. Moreover, the Reef-WEC can be configured with a foundation that has no hazardous anchors or mooring lines such as are needed for floating WECs. As such, the Reef-WEC can potentially help mitigate some effects of climate change by acting as an artificial reef or habitat, as proven for offshore wind and oil platforms. In addition, the Reef-WEC allows more natural water exchange in and out of harbors than less porous and non-submerged barriers, improving harbor water and ecosystem equality. In addition, the flap of a WEC can be lowered during periods of high thermal events to increase water exchange with cooler ocean-side water. The nature-positive design, nearly invisible submerged structure, and economic benefits of localized manufacturing can help obtain community acceptance and support for Reef-WECs than other WECs.

Figure 5A:
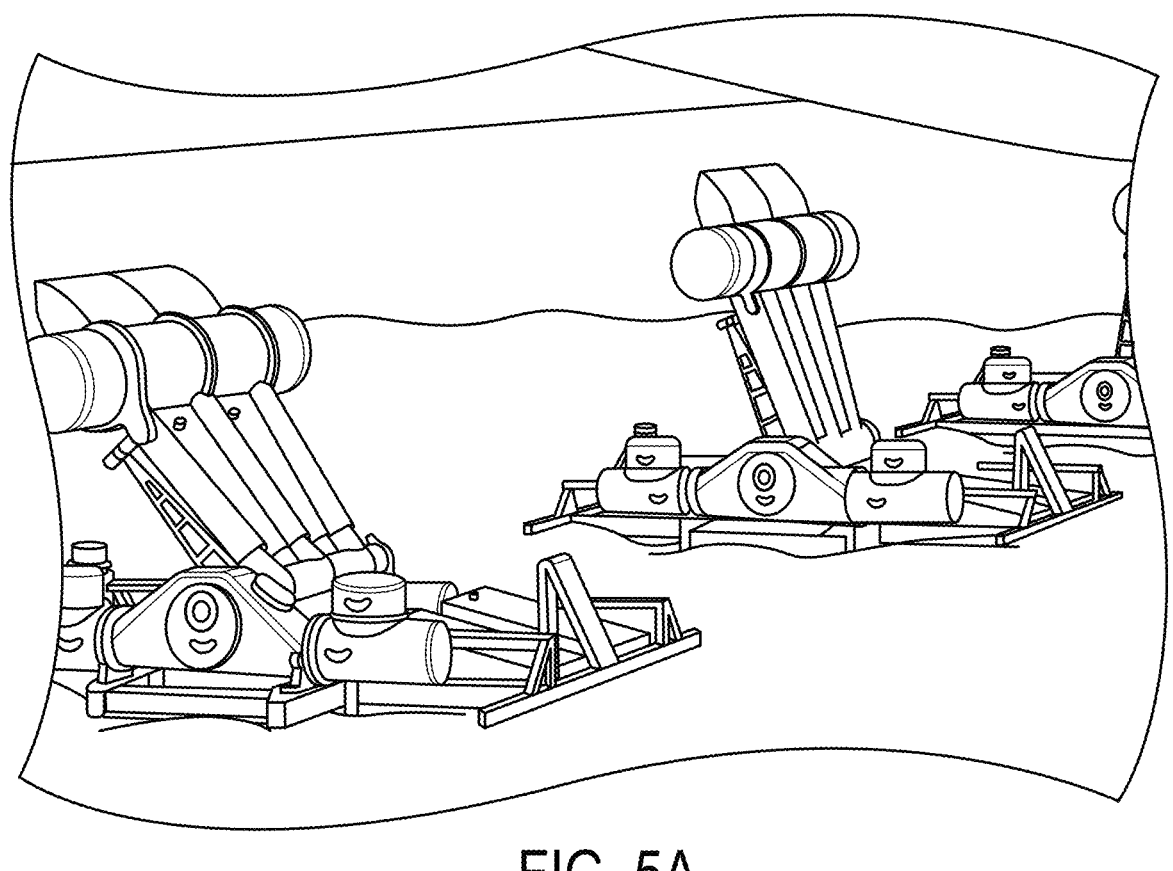
FIG. 5A is a schematic diagram showing an example 10-30 kW WaveRoller-X unit installed on an underwater floor.
Figure 5B:
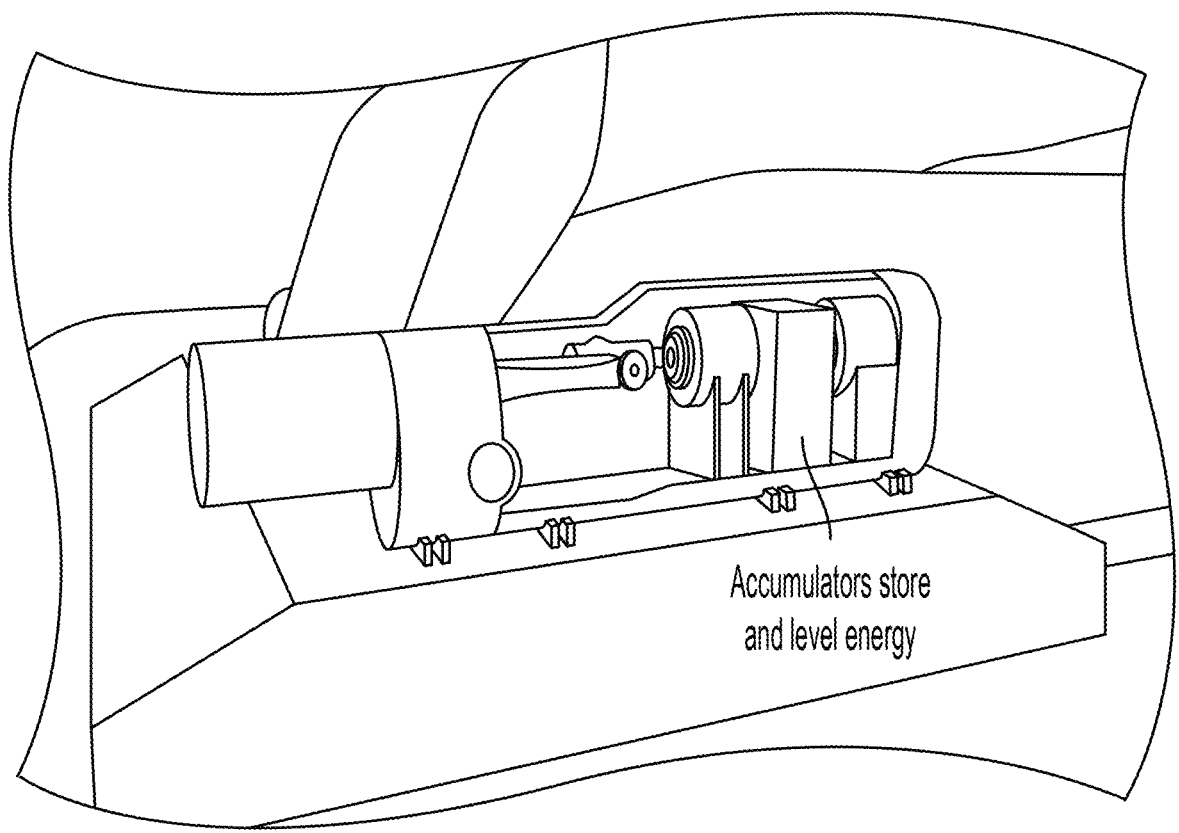
FIG. 5B is a schematic diagram of an example utility-scale WaveRoller model that has hydraulic power takeoffs.

In some implementations, such as shown in FIGS. 5A-5B, the energy converter systems include one or more submerged oscillating surge wave converters. For example, a Reef-WEC may be an integrated below-water flap-style oscillating surge WEC, such as the Wave Roller technology developed by AW-Energy or HNEI's HAWSEC. These two WECs have a low visual impact and their levelized cost of energy (LCOE) is expected to be below that of other WECs. Both WECs may be configured as bottom-mounted surge devices with a hinged panel. The WaveRoller-X "small-scale" unit may be configured to produce about 10-30 kW of electrical energy, and the back-and-forth movement of water driven by a wave surge puts its flap into motion. To maximize the energy that the panel (or flap) can absorb from the waves, the panel spans much or all of the depth of the water column from the seabed up to the water surface level. As the WaveRoller-X panel moves and absorbs the energy from ocean waves, it rotates a shaft that drives a gearbox and electric motors. The larger utility scale WaveRoller models (e.g., 350-kW to 1-MW of electrical energy production) use hydraulic pistons attached to the panel to pump hydraulic fluids inside a closed hydraulic circuit. An accumulator system helps smooth the variable power.

FIG. 5A presents a schematic diagram showing an example 10-30 kW WaveRoller-X unit installed on an underwater floor. FIG. 5B is a schematic diagram of an example utility-scale WaveRoller model that has hydraulic power takeoffs. All the elements of the hydraulic circuit of a WaveRoller unit are enclosed inside a hermetic structure inside the device and are not exposed to the marine environment; consequently, there is no risk of leakage into the ocean. The grid-compatible electrical output from the power plant is connected to the local grid via a subsea cable, with inverters on shore. In certain configurations, the WaveRoller-X has an extraordinarily low LCOE. This cost-effectiveness stems in part from the WaveRoller's significant advantages in the capture width ratio and absorbed energy per surface area (MWh/m$^2$).

In some implementations, the energy converter systems may include a scalable method of floating out, installation, and servicing. Depending on site requirements and vessel availability, a Reef-WEC can be designed as relatively small modules or very large structures. Smaller Reef-WECs can be loaded onto a barge for transport to the site and lowered to the sea floor using a crane. Larger, heavier Reef-WECs can be loaded on a submersible dock, transported to deeper water, and wet-towed to the site using temporary buoyancy such as buoyancy bags or pontoons.

In some implementations, the mass of a Reef-WEC can be reduced to facilitate load-out and transport by incorporating hollow cavities in the reef sections that can be filled with low-cost ballast (such as local rock, iron ore, sand, or recycled concrete) after installation on the seafloor. The top layer of the ballast can be covered with a 3DCP lid textured to facilitate additional bio growth. As an additional benefit, the addition of low-cost, non-structural ballast reduces the volume, cost, and carbon footprint of the of concrete materials needed, and helps eliminate the need for anchors by cost-effectively increasing overall Reef-WEC mass to improve overturning resistance.

The energy converter systems may provide one or more advantages, including: (1) low-cost clean coastal electricity, (2) increased energy diversity for reduced electrical variability and storage needs, (3) enhanced coastal resilience in the face of inexorably rising sea levels, and (4) restoration and extension of dwindling coastal marine habitats. These advantages are discussed further below.

In some implementations, the energy converter systems provide resilience. There is an urgent need for techniques to affordably increase coastal resilience. According to the 2022 report of the U.S. Sea Level Rise and Coastal Flood Hazard Scenarios and Tools Interagency Task Force, sea-level rise "will create a profound shift in coastal flooding over the next 30 years by causing tide and storm surge heights to reach higher elevations and extend further inland." In much of the U.S., a mere 5-10 cm of rise will double flooding frequency; by 2050, the Task Force projects a significant increase in US flood frequency, including a five-fold increase in major flooding. U.S. utilities are presently investing billions in resilience, including measures to resist coastal flooding.

In some implementations, the energy converter systems also provide ecosystem benefits. Basing Reef-WEC on a 3DCP living-breakwater technology offers several environmental advantages that are increasingly important as marine ecosystems are disrupted by increasing temperatures and habitat loss. The Reef-WEC will be designed to act as an artificial reef, promoting marine life colonization as has been demonstrated for offshore wind and oil and gas structures. The Reef-WEC can, for example, incorporate UH's DARPA-backed REEFense technologies into Reef-WEC to grow coral and oysters in only a few years, compared to the usual 50-100 year growth cycle. The absence of mooring lines and anchors also avoids environmental risks such as marine-life entanglements, mooring line scour, and anchor drag. The Reef-WEC can, in certain cases, also further reduce carbon footprint approximately 50% by using low-carbon concrete materials instead of aluminum and steel for the WEC support structure.

In some implementations, the energy converter systems can be manufactured using 3DCP at a domestic site. 3DCP is a new form of manufacturing that can be used to make essential components for marine energy as well as offshore solar, wind, energy storage, and artificial reefs. For example, a 3DCP manufacturing facility with 1 to 5 printers working simultaneously with a trained workforce of 10-15 persons per printer can create Reef-WEC modules with domestically sourced concrete material and equipment.

Manufacturing offshore components on-site in regional ports can benefit disadvantaged communities, as local workers will be needed and communities near ports. In many instances, manufacturing operations can be done at or near ports, e.g., at the Port of Los Angeles, where RCAM Technologies has a 3DCP manufacturing facility.

Figures 1, 6A:
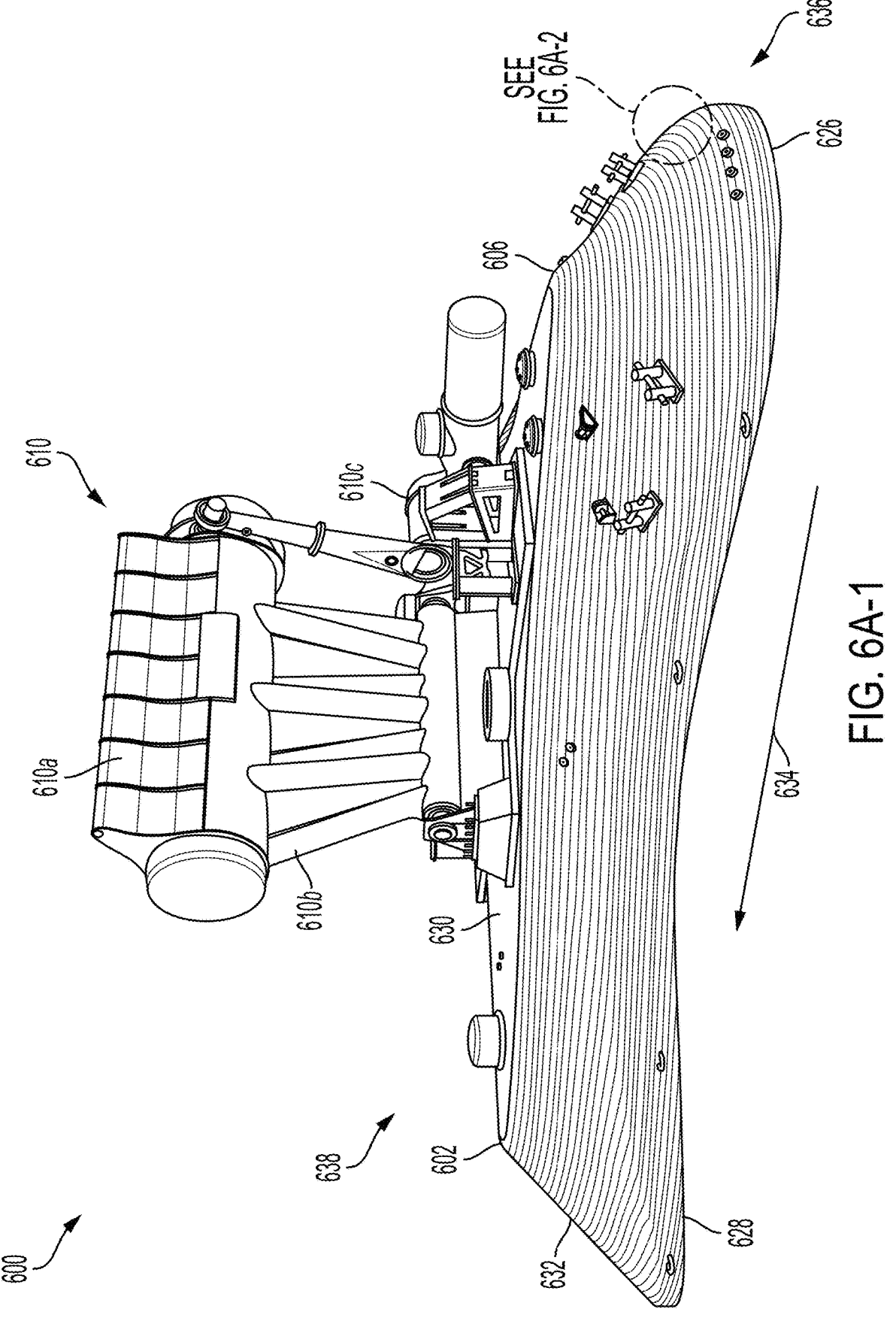
Figures 2, 6A:
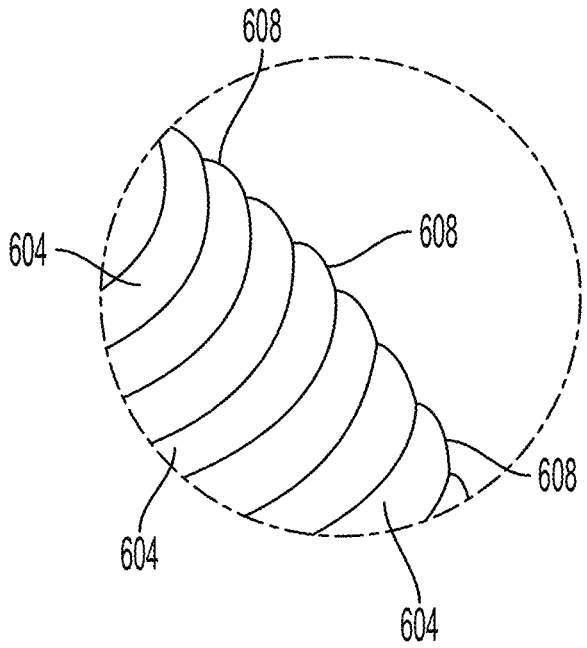

Although the example system 200 of FIG. 2A-1 is illustrated with a configuration that breaks the wave motion of water, other configurations are possible. For example, FIG. 6A-1 presents a schematic diagram, in perspective view, of a second example system 600 for converting wave motion into electrical energy. The second example system 600 is analogous to the example system 200 of FIG. 2A-1 and features common to both FIGS. 2A-1 and 6A-1 are related via coordinated numerals that differ in increment by four hundred.

The second example system 600 includes a support structure 602 that is formed of layers of cementitious material 604. The cementitious material may include cement and aggregate (e.g., sand or gravel). In some instances, the cementitious material may also include reinforcing elements, such as fibers (e.g., steel fibers, polymer fibers, basalt fibers, glass fibers, etc.), rebar (e.g., steel rebar, basalt rebar, etc.), mesh (e.g., steel mesh, fiber mesh, etc.), cables, tendons, staples, and so forth. The layers of cementitious material 604 may, in certain cases, be deposited successively on top of each other by an additive manufacturing process, such as a 3D printing process. FIG. 6A-2 presents a detail view of the support structure 602, showing a portion that includes individual layers of cementitious material 604. The support structure 602 has an exterior surface 606 that is configured to support marine life on the support structure 602. For example, the exterior surface 606 may include surfaces that define ridges, grooves, pockets, nooks, and so forth on or in the support structure 602.

In many implementations, such as shown in FIG. 6A-2, the layers of cementitious material 604 define respective ridge surfaces 608 on the exterior surface 606 of the support structure. The ridge surfaces 608 may allow marine organisms (e.g., coral, sponges, anemone, etc.) to attach to and grow on the support structure 602, thereby providing a habitat for other types of marine animals (e.g., fish, octopuses, shrimp, urchins, clams, oysters, sea stars, etc.).

The second example system 600 also includes a wave energy converter 610 that is supported by the support structure 602. The wave energy converter 610 is configured to generate electrical energy in response to flowing water contacting a movable surface 610a of the wave energy converter 610. For instance, the wave energy converter 610 may include a flap 610b that is configured to move in response to the flowing water and includes the movable surface 610a. The wave energy converter 610 may also include an electrical generator 610c that is coupled to the flap 610b and configured to generate electrical energy in response to motion of the flap 610b. Examples of this configuration for the wave energy converter 610 have been described previously in relation to FIGS. 5A and 5B.

In some implementations, the support structure 602 includes an artificial reef 626 formed of the layers of cementitious material 604 (or at least a portion thereof). In these implementations, the support structure 602 also includes a bottom surface 628 configured to contact a floor of a body of water. The support structure 602 additionally includes a support surface 630 that resides above the bottom surface 628 and is configured to support the wave energy converter 610. A transition surface 632 extends between the bottom and support surfaces 628, 630 and includes at least a portion of the ridge surfaces 608. As shown in FIG. 6A-1, the wave energy converter 610 is disposed on the support surface 630 of the artificial reef 626. Moreover, the exterior surface 606 of the support structure 602 includes the bottom surface 628, the support surface 630, and the transition surface 632 of the artificial reef 626. In certain cases, the transition surface 632 includes one or more pocket surfaces that define a pocket extending into the artificial reef 626 from the transition surface 632.

In some implementations, the artificial reef 626 includes a flow direction 634 that extends between leading and trailing sides 636, 638 of the artificial reef 626. The artificial reef 626 also includes a width that increases along the flow direction 634 from the leading side 636 to the trailing side 638. This configuration of the artificial reef 626 may allow the artificial reef 626 provide a "tripod base" support structure for the wave energy converter 610. This configuration may also allow the support structure 602 to present a streamlined profile to incoming waves when the flow direction 634 is aligned parallel to a motion of the waves. The configuration may also reduce a cross-section of the support structure 602 to the waves moving parallel to the flow direction 634.

Figure 6B:
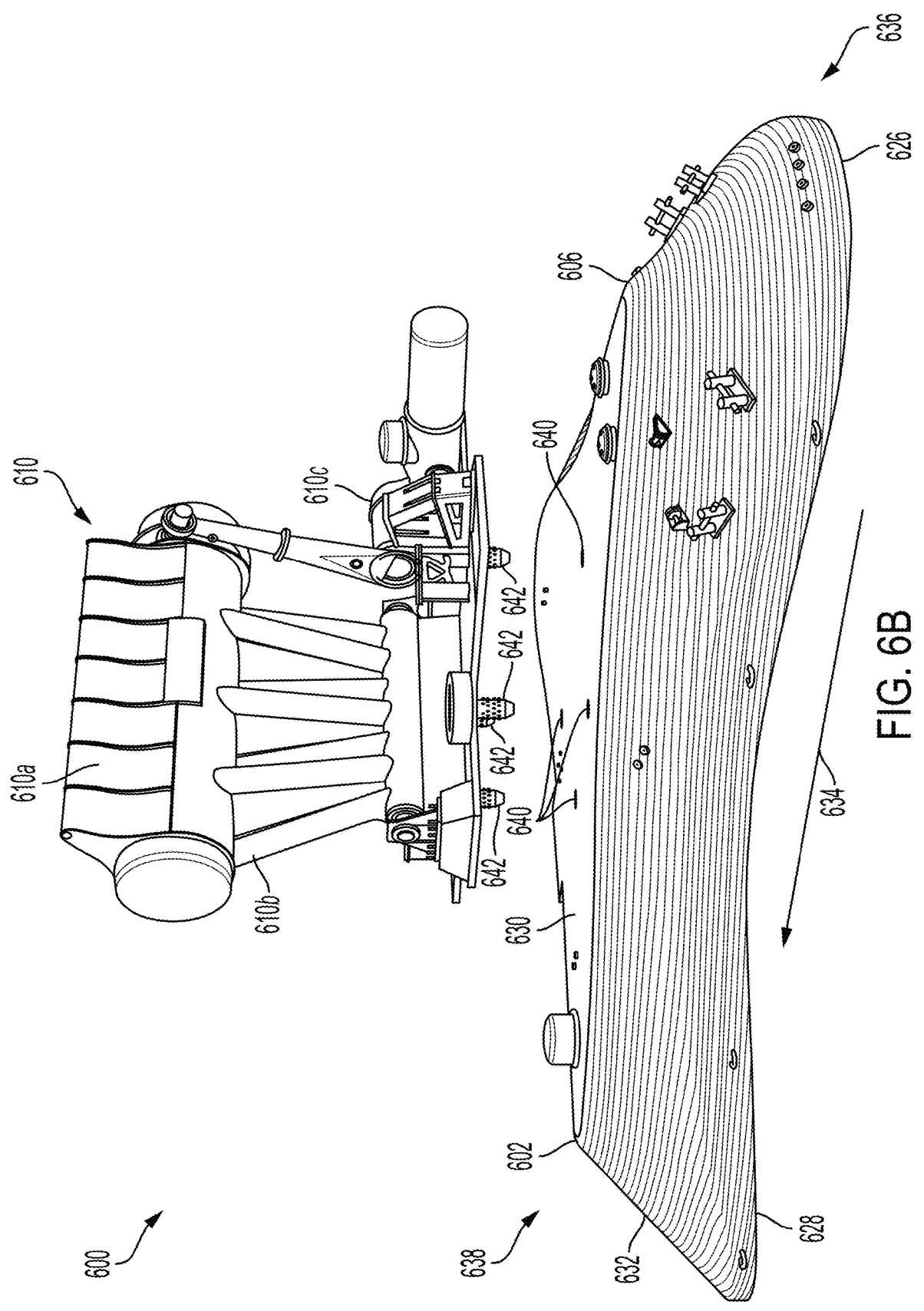
FIG. 6B is a schematic diagram, in perspective view, of the second example system of FIG. 6A.

In some implementations, the artificial reef 626 may include a mount 640 on the support surface 630 that is configured to allow the wave energy converter 610 to selectively couple to, and uncouple from, the artificial reef 626 (e.g., a "quick disconnect" mount). For example, as shown in FIG. 6B, the support structure 602 may include a plurality of holes 640 that extend into the support surface 630 and are configured to receive respective cylindrical feet 642 of the wave energy converter 610. The cylindrical feet 642 may be configured to lock into their respective holes 640, thereby securing the wave energy converter 610 to the support structure 602. In these implementations, the mount 640 may allow the wave energy converter 610 to be selectively mounted to, and dismounted from, the artificial reef 626 without disturbing the marine organisms attached to and growing on the artificial reef 626.

In some aspects of what is described, a system may be described by the following examples. The system may be configured to convert wave motion into electrical energy. The system includes a support structure and a wave energy converter. The support structure is formed of layers of cementitious material and has an exterior surface that, in many cases, is configured to support the growth of marine life on the support structure. For example, the exterior surface may include surfaces that define ridges, grooves, pockets, nooks, and so forth on or in the support structure. Other features are possible.

Example 1. A system for converting wave motion into electrical energy, the system comprising:
a support structure formed of layers of cementitious material that define respective ridge surfaces on an exterior surface of the support structure; and
a wave energy converter supported by the support structure and configured to generate electrical energy in response to flowing water contacting a movable surface of the wave energy converter.

Example 2. The system of example 1, wherein wave energy converter comprises:
a flap configured to move in response to the flowing water and comprising the movable surface; and an electrical generator coupled to the flap and configured to generate electrical energy in response to motion of the flap.

Example 3. The system of example 1 or example 2, wherein the layers of cementitious material are deposited successively on top of each other by a 3D printing process.

Example 4. The system of example 1 or any one of examples 2-3,
wherein the support structure comprises a breakwater having first and second walls that extend from a base of the breakwater and are separated from each other by a gap through the breakwater; and
wherein the wave energy converter is disposed in the gap and extends between the first and second walls.

Example 5. The system of example 4, wherein the first and second walls are aligned along a direction that is perpendicular to a direction of water flow through the gap.

Example 6. The system of example 4 or example 5, wherein the first and second walls of the breakwater comprise respective ballast cavities that are configured to receive ballast material.

Example 7. The system of example 4 or any one of examples 5-6, wherein the gap resides above the base.

Example 8. The system of example 4 or any one of examples 5-7,
wherein the exterior surface of the support structure comprises an exterior surface of the breakwater; and
wherein the exterior surface of the breakwater comprises one or more pocket surfaces that define a pocket extending into the breakwater from the exterior surface.

Example 9. The system of example 1 or any one of examples 2-3,
wherein the support structure comprises an artificial reef formed of the layers of cementitious material and having:
a bottom surface configured to contact a floor of a body of water,
a support surface residing above the bottom surface and configured to support the wave energy converter, and
a transition surface extending between the bottom and support surfaces and comprising at least a portion of the ridge surfaces;
wherein the exterior surface of the support structure comprises the bottom surface, the support surface, and the transition surface of the artificial reef; and
wherein the wave energy converter is disposed on the support surface of the artificial reef.

Example 10. The system of example 9, wherein the artificial reef comprises:
a flow direction that extends between leading and trailing sides of the artificial reef; and
a width that increases along the flow direction from the leading side to the trailing side.

Example 11. The system of example 9 or example 10, wherein the transition surface comprises one or more pocket surfaces that define a pocket extending into the artificial reef from the transition surface.

Example 12. The system of example 9 or any one of examples 10-11, wherein the artificial reef comprises a mount on the support surface that is configured to allow the wave energy converter to selectively couple to, and uncouple from, the artificial reef.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for converting wave motion into electrical energy, the system comprising:

a support structure formed of layers of cementitious material that define respective ridge surfaces on an exterior surface of the support structure; and a wave energy converter supported by the support structure and configured to generate electrical energy in response to flowing water contacting a movable surface of the wave energy converter;

wherein the support structure comprises an artificial reef formed of the layers of cementitious material and having:

a bottom surface configured to contact a floor of a body of water, a support surface residing above the bottom surface and configured to support the wave energy converter, and a transition surface extending between the bottom and support surfaces and comprising at least a portion of the ridge surfaces;

wherein the exterior surface of the support structure comprises the bottom surface, the support surface, and the transition surface of the artificial reef; and wherein the wave energy converter is disposed on the support surface of the artificial reef.

2. The system of claim 1, wherein wave energy converter comprises:

a flap configured to move in response to the flowing water and comprising the movable surface; and an electrical generator coupled to the flap and configured to generate electrical energy in response to motion of the flap.

3. The system of claim 1, wherein the layers of cementitious material are deposited successively on top of each other by a 3D printing process.

4. The system of claim 1, wherein the artificial reef comprises:

a flow direction that extends between leading and trailing sides of the artificial reef; and a width that increases along the flow direction from the leading side to the trailing side.

5. The system of claim 1, wherein the transition surface comprises one or more pocket surfaces that define a pocket extending into the artificial reef from the transition surface.

6. The system of claim 1, wherein the artificial reef comprises a mount on the support surface that is configured to allow the wave energy converter to selectively couple to, and uncouple from, the artificial reef.

*    *    *    *    *